United States Patent
Ebrahimi Afrouzi

(10) Patent No.: US 9,661,477 B1
(45) Date of Patent: May 23, 2017

(54) COLLABORATIVE ROBOTIC DEVICE WORK GROUP

(71) Applicant: Ali Ebrahimi Afrouzi, San Jose, CA (US)

(72) Inventor: Ali Ebrahimi Afrouzi, San Jose, CA (US)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 15/048,827

(22) Filed: Feb. 19, 2016

Related U.S. Application Data

(60) Provisional application No. 62/129,667, filed on Mar. 6, 2015.

(51) Int. Cl.
| | |
|---|---|
| H04B 7/00 | (2006.01) |
| H04W 4/08 | (2009.01) |
| H04W 4/00 | (2009.01) |
| H04W 12/06 | (2009.01) |
| H04W 8/00 | (2009.01) |
| H04L 29/06 | (2006.01) |
| H04W 84/18 | (2009.01) |

(52) U.S. Cl.
CPC ............. *H04W 4/08* (2013.01); *H04L 63/083* (2013.01); *H04W 4/006* (2013.01); *H04W 8/005* (2013.01); *H04W 12/06* (2013.01); *H04W 84/18* (2013.01)

(58) Field of Classification Search
CPC  G06N 3/04; G06N 3/049; G06N 3/08; G06N 3/10
USPC ......... 455/500, 518, 519, 412.1, 414.1, 418, 455/419, 41.1, 41.2; 713/167; 709/204, 709/225, 229, 223, 200; 700/245, 246, 700/250, 248, 255; 701/25; 707/100; 706/11; 318/568.12, 581
See application file for complete search history.

(56) References Cited

U.S. PATENT DOCUMENTS

| | | | |
|---|---|---|---|
| 6,611,120 B2* | 8/2003 | Song ................... | G05D 1/0038 318/568.12 |
| 7,346,429 B2* | 3/2008 | Goldenberg .......... | G08C 17/00 318/568.11 |
| 8,307,061 B1* | 11/2012 | Hickman ................. | B25J 9/161 318/568.12 |
| 2005/0038562 A1* | 2/2005 | Bash .................... | G05D 1/0274 700/245 |
| 2005/0080799 A1* | 4/2005 | Harnden ............... | H04L 67/125 |
| 2005/0172024 A1* | 8/2005 | Cheifot ............. | H04L 29/12009 709/225 |
| 2005/0287038 A1* | 12/2005 | Dubrovsky .......... | G05B 19/409 422/63 |
| 2005/0288819 A1* | 12/2005 | de Guzman ............ | F16L 55/32 700/245 |
| 2006/0079997 A1* | 4/2006 | McLurkin .............. | G06N 3/008 700/245 |

(Continued)

*Primary Examiner* — Tan H Trinh

(57) ABSTRACT

A method for enabling communication and collaboration between robotic device. Robotic devices exchange wireless signals to connect to one another and enter an authentication phase. After authenticating, robotic devices add new devices to a network containing all authenticated robotic devices. Robotic devices within a network may send or receive information or instructions to and from other robotic devices in the network. Robotic devices that are out of direct signal range of other robotic devices may communicate them via other robotic devices within the network that form a bridge to forward the signals to the intended target.

12 Claims, 3 Drawing Sheets

(56) References Cited

U.S. PATENT DOCUMENTS

| | | | | |
|---|---|---|---|---|
| 2009/0082879 A1* | 3/2009 | Dooley | ............... | B25J 9/1658 700/3 |
| 2009/0248200 A1* | 10/2009 | Root | ............... | B25J 9/1689 700/245 |
| 2009/0306823 A1* | 12/2009 | Baltes | ............... | G05D 1/0274 700/245 |
| 2010/0109842 A1* | 5/2010 | Patel | ............... | G01S 5/0252 340/10.1 |
| 2011/0202175 A1* | 8/2011 | Romanov | ............... | A47L 11/4011 700/250 |
| 2011/0289496 A1* | 11/2011 | Steer | ............... | G06F 8/65 717/169 |
| 2013/0123981 A1* | 5/2013 | Lee | ............... | H04W 4/02 700/248 |
| 2014/0012415 A1* | 1/2014 | Benaim | ............... | G06K 9/00355 700/248 |
| 2014/0032034 A1* | 1/2014 | Raptopoulos | ............... | G08G 5/0069 701/25 |
| 2014/0089232 A1* | 3/2014 | Buibas | ............... | G06N 3/049 706/11 |
| 2014/0149592 A1* | 5/2014 | Krishna | ............... | G06F 1/329 709/226 |
| 2015/0273693 A1* | 10/2015 | Cohen | ............... | B25J 9/1661 700/253 |
| 2015/0283706 A1* | 10/2015 | Cohen | ............... | B25J 9/1661 700/248 |
| 2015/0336270 A1* | 11/2015 | Storr | ............... | B25J 9/1674 700/245 |
| 2015/0358810 A1* | 12/2015 | Chao | ............... | H04W 4/001 455/418 |
| 2016/0005338 A1* | 1/2016 | Melendez-Calderon | ............... | G09B 23/32 434/267 |
| 2016/0016315 A1* | 1/2016 | Kuffner, Jr. | ............... | B25J 9/1676 700/255 |
| 2016/0167225 A1* | 6/2016 | Merana | ............... | B25J 9/16 700/245 |
| 2016/0249327 A1* | 8/2016 | Chen | ............... | H04L 5/0039 |

* cited by examiner

COLLABORATIVE ROBOTIC DEVICE WORK GROUP

CROSS-REFERENCE TO RELATED APPLICATIONS

This application claims the benefit of provisional patent application Ser. No. 62/129,667, filed Mar. 6, 2015 by the present inventor.

FIELD OF INVENTION

The present invention relates to robotic devices that perform tasks, and more particularly, robotic device work groups.

BACKGROUND OF INVENTION

The following is a tabulation of some prior art that presently appears relevant:

| U.S. patent Documents | | | |
| --- | --- | --- | --- |
| Pat. No. | Kind Code | Issue Date | Patentee |
| 7,346,429 | B2 | Mar. 18, 2008 | Engineering Services Inc |
| 6,611,120 | B2 | Aug. 26, 2003 | Samsung Electronics Co Ltd |
| 7,609,753 | B1 | Oct. 27, 2009 | Rockwell Collins Inc |
| 7,953,110 | B1 | May 31, 2011 | Boeing Co |
| 6,484,083 | B1 | Nov. 19, 2002 | Sandia Corp, Sandia National Laboratories |
| 8,515,577 | B2 | Aug. 20, 2013 | Yulun Wang, Charles S. Jordan, Keith Philip Laby, Jonathan Southard |

Robotic devices have become increasingly common for carrying out routine tasks. With advances in technology, robotic devices have become useful for carrying out more complex tasks or replace humans in carrying out dangerous work. Communication between robotic devices is necessary in systems that utilize more than one entity. A need exists for improved methods for robotic devices to communicate and share information with one another to more efficiently complete work.

SUMMARY OF INVENTION

It is a goal of the present invention to provide a method for robotic devices working to accomplish a common task or related tasks to communicate with one another in order to more efficiently complete work.

The aforementioned goal is accomplished by exchanging wireless signals between robotic devices to connect and authenticate them. Robotic devices maintain a database of authenticated robotic devices in their network. Within a network, information regarding the environment gathered from sensors or tools on different robotic devices may be shared with other network members. Instructions or information may be pushed or pulled from one robotic device to another to more efficiently execute the tasks assigned to the group.

DETAILED DESCRIPTION OF THE INVENTION

The present invention proposes a collaborative robotic device work group in which a group of synchronized robotic devices exchange signals to complete a task in the most efficient way possible. Robotic devices, as referred to herein, may be actuated or non-actuated, but must have a means for transmitting, receiving and processing wireless signals. Any available type of wireless communication may be used, including radio waves, bluetooth, and wifi signals.

Figure 1:
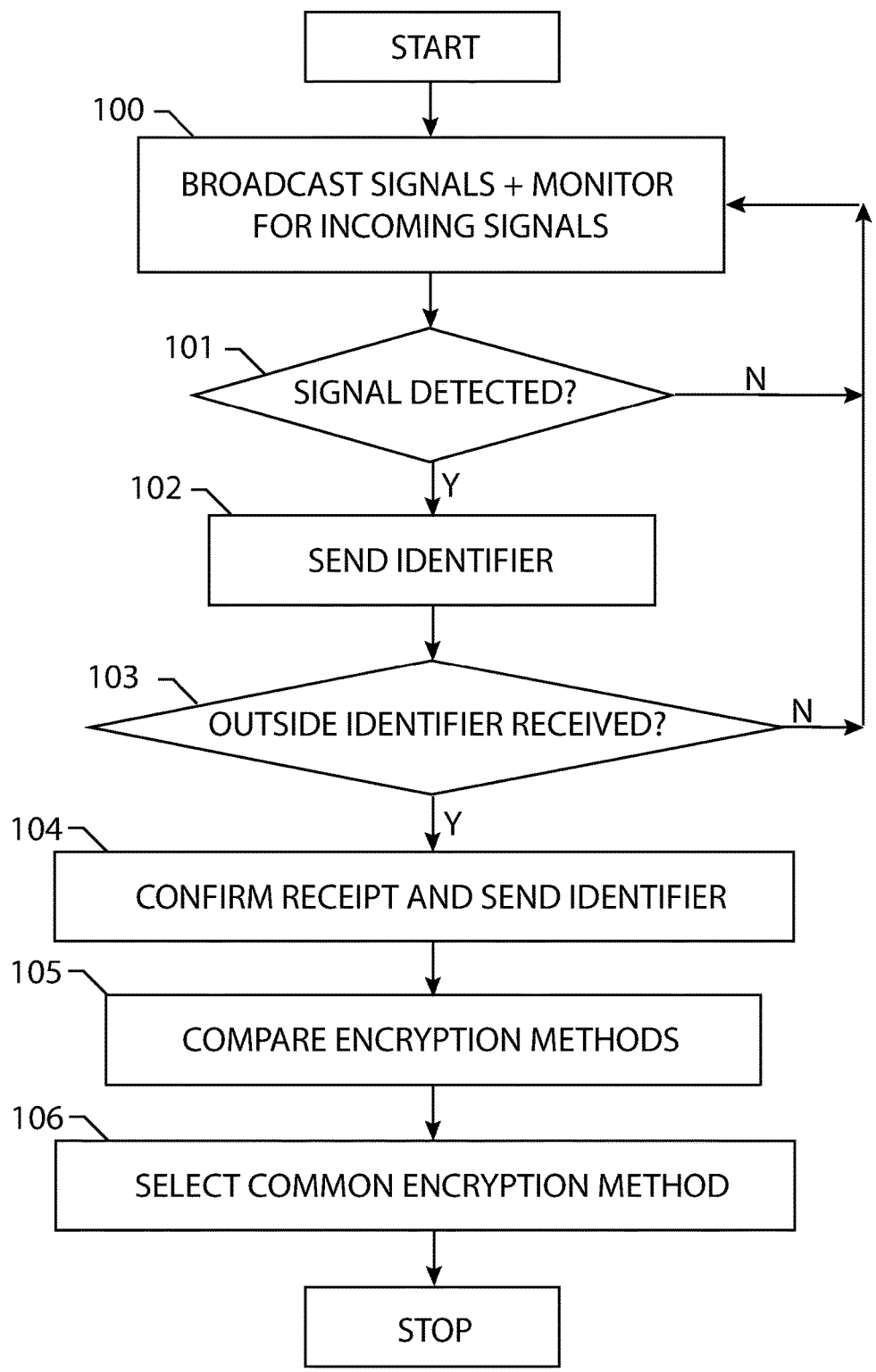
FIG. 1 illustrates the process of forming a connection between two robotic devices embodying features of the present invention.

Referring to FIG. 1, the process of establishing a connection between two robotic devices is illustrated. In a first step 100, a robotic device broadcasts signals to indicate that it is present and monitors for incoming signals from outside robotic devices. If the robotic device receives an incoming signal in a next step 101, the method proceeds to a next step 102. (If no incoming signals are received, the method repeats step 100). In step 102, the robotic device sends its unique identifier to the outside robotic device. If a robotic device receives a unique identifier from an outside robotic device in a step 103, the method proceeds to a next step 104 to confirm receipt of the unique identifier and send its own unique identifier to the outside robotic device. The robotic devices have thus been identified to each other.

In the preferred embodiment, connection between two robotic devices further includes an encryption negotiation phase to determine whether they will encrypt the information that they exchange. In a next step 105, the robotic devices transmit to one another a list of the encryption methods of which each device is capable. In a next step 106, the devices select a common encryption method, if one exists, for encrypting all exchanged going forward.

In some embodiments, if no common encryption method exists, the connection is canceled and communication is halted. In some embodiments, if no common encryption method exists, communication will continue unencrypted (in plain text).

In the preferred embodiment, robotic devices are further assigned tags that identify them as belonging to various subgroups. Tags may be based on the model of the robotic device, a unique identifier, a country of origin, a manufacturer, a firmware version, a software version, an operating system, functions, or any other parameter of the device. Robotic devices compare tags to determine if they share common parameters. If the robotic devices share at least one common tag, they proceed to an authentication phase. (In embodiments with no tag comparison process, robotic devices may proceed directly from the prior step to the authentication phase.)

Figure 2:
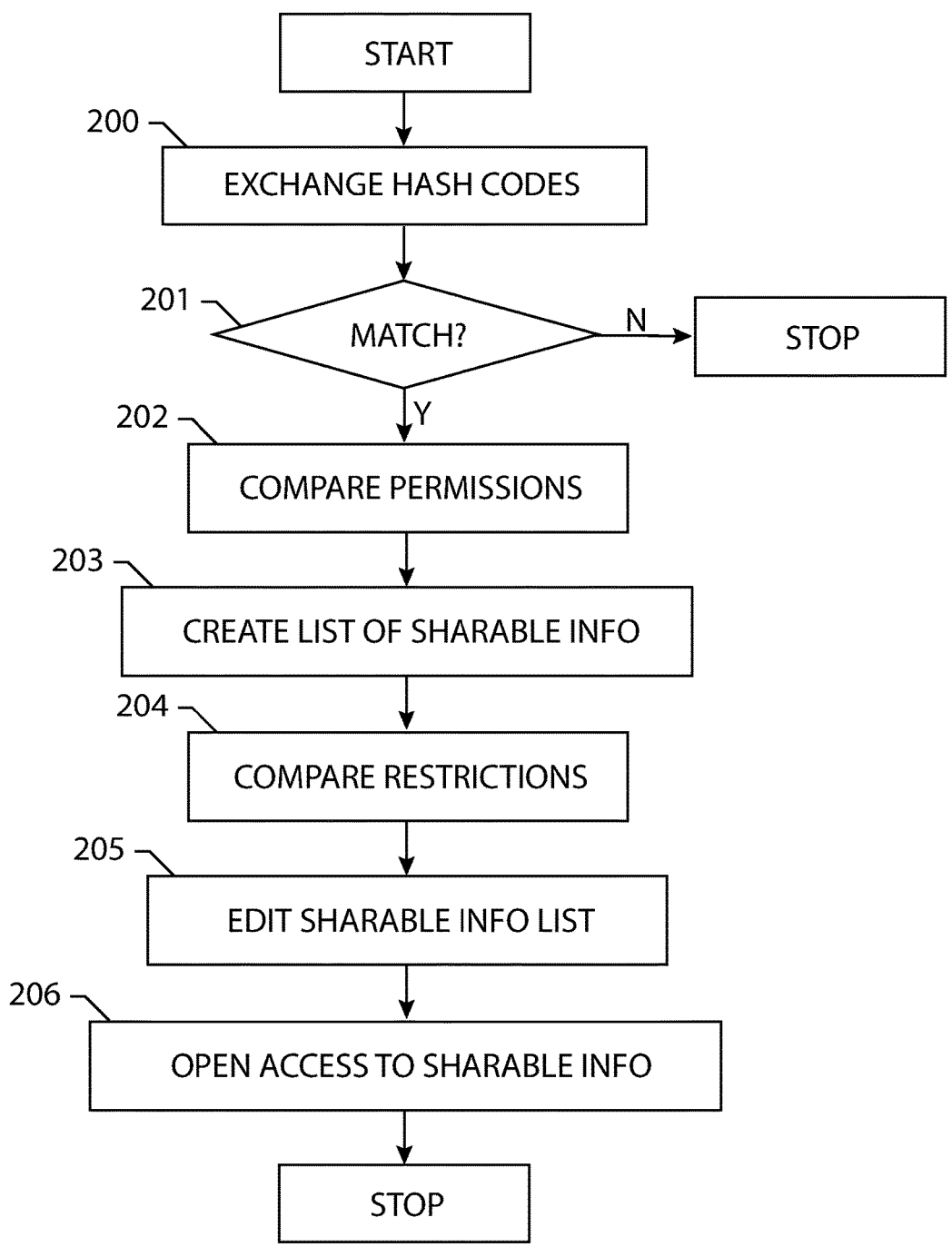
FIG. 2 illustrates the authentication process embodying features of the present invention.

Referring to FIG. 2, the authentication process is illustrated. In a first step 200, two robotic devices that have identified each other exchange hash codes. Hash codes are based on an original shared preset passcode. If the hash codes match in a next step 201, the method proceeds to a next step 202 to compare lists of permissions. Permissions shall be assigned during manufacture to designate what specific information from the local robotic device may be accessed by outside robotic devices. In a next step 203, the robotic devices establish a list of sharable information containing all information categories that may be shared according to the permissions lists. In a next step 204, the robotic devices compare lists of restrictions. Restrictions shall be assigned during manufacture to limit specific information from the local robotic device that may not be accessed by outside robotic devices. In a next step 205, the robotic devices remove any restricted information from the sharable information list. At this point, authentication is complete and the method may proceed to a final step 206 to open access between the robotic devices to all the identified sharable information.

Authenticated robotic devices form a network of all robotic devices that have been authenticated. Robotic devices maintain a database of other robotic devices in the network, which is shared with robotic devices of the network, so that when a first robotic device authenticates a second robotic device, other robotic devices already in the network may also share information and connect with the second robotic device. In the preferred embodiment, robotic devices also store specifications regarding each robotic device in the network in the database. Specifications may include location of the robotic device, model, type, functionality, role, operating system, software version, tags, and any other characteristics.

Figure 3:
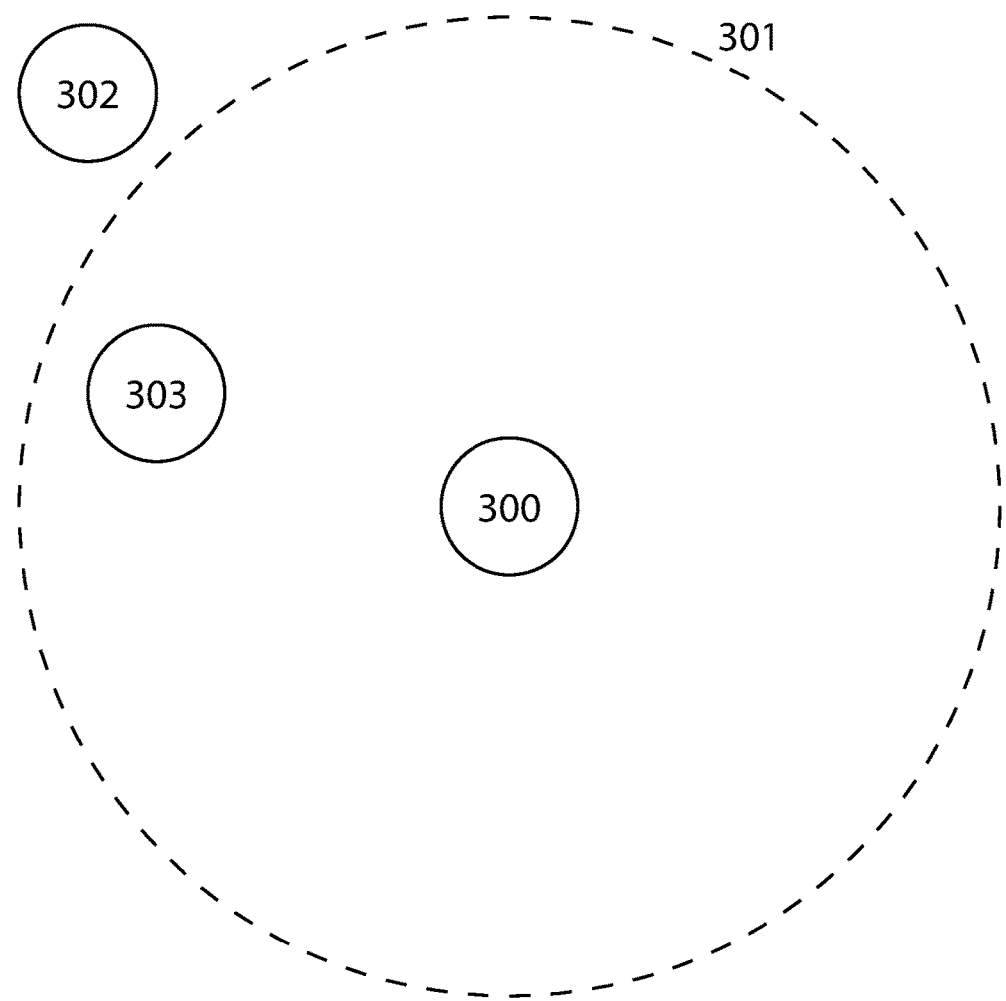
FIG. 3 illustrates a network of robotic devices embodying features of the present invention.

Referring to FIG. 3, an overhead view of a network of authenticated robotic devices is illustrated. The database permits a first robotic device that is out of signal range from a second robotic device to exchange information with the second robotic device through signals relayed from other robotic devices that form a bridge to the second robotic device. Robotic device 300 has a signal range ending at the dashed line 301. Robotic device 302 is outside the signal range of robotic device 300, so robotic device 300 would not be able to send a signal directly to robotic device 302. However, if both robotic devices are authenticated within the network of robotic devices comprised of robotic devices 300, 302, 303, then robotic devices 300 and 302 are aware of one another and may exchange information by sending a signal from robotic device 300 to robotic device 303, which forwards the signal to robotic device 302. Signals from one robotic device in a network may be forwarded through any number of other robotic devices to reach the target robotic device. All signals transmitted in the system shall contain one or more targets which identify the intended recipient of the signal. Robotic devices receiving a signal read the target to determine whether the signal should be applied to the local device or forwarded to another device in the network or both.

In the preferred embodiment, the presence of each robotic device in a network's database is verified at periodic intervals through keepalives. If more than a predetermined number of keepalives are missed, a robotic device may be removed from the database.

In the preferred embodiment, signals sent between robotic devices may comprise either environmental or operational data. Environmental data is data gathered by sensors positioned on a robotic device regarding the environment. Environmental data may include the location of obstacles, the type of surface in the work area, the location of a charging station, or any other information regarding the surroundings. Operational data is data related to the activity or functions of a robotic device. Operational data may include instructions, the status of various functions of a robotic device, the current task of a robotic device, the completed tasks of a robotic device, next tasks of a robotic device, etc.

In some embodiments, robotic devices are additionally assigned rankings during an initial set-up phase that dictate what signals may be distributed to and from certain robotic devices. Some robotic devices may be assigned a ranking that disallows them from assigning instructions to other robotic devices. Some robotic devices may be assigned rankings that permit them to delegate tasks to other robotic devices. Rankings may also be used to resolve conflicts between robotic devices carrying out conflicting tasks.

In some embodiments, pairs of robotic devices may be assigned master and slave roles and work together to complete a task. A master robotic device may provide instructions to a slave robotic device, the slave robotic device being configured to accept and execute instructions provided by a master robotic device.

I claim:

1. A collaborative robotic device work group comprised of a plurality of robotic devices, robotic devices having a means for transmitting and receiving instructions or information to and from other robotic devices through wireless signals, wherein robotic devices:
   establish connections to other compatible robotic devices by exchanging wireless signals;
   authenticate connected robotic devices to form a network of robotic devices;
   maintain a database of all robotic devices in the network;
   share said database with all robotic devices in the network via wireless signals; and
   send and receive data to and from robotic devices in the network through signals sent directly from one robotic device to another or forwarded through any number of robotic devices to reach a target robotic device to push and pull information or instructions to and from members of the network to more efficiently complete the tasks of the group.

2. The collaborative robotic device work group of claim 1 wherein wireless signals are any of: radio waves, bluetooth signals, and wifi signals.

3. The collaborative robotic device work group of claim 1 wherein signals may comprise any of:
   information regarding the environment of a robotic device obtained from sensors or measuring tools positioned thereon;
   instructions for carrying out operations; and
   information regarding the status of operations of a robotic device.

4. The collaborative robotic device work group of claim 1 wherein signals further comprise one or more target robotic devices that indicate whether recipients should read the signal or forward it to one or more other robotic devices or both read and forward the signal to one or more other robotic devices.

5. The collaborative robotic device work group of claim 1 further comprising an encryption negotiation phase, occurring after authentication, in which robotic devices determine which encryption method will be used to encrypt exchanged data going forward.

6. The collaborative robotic device work group of claim 1 in which robotic devices exchange keepalive signals periodically to maintain their presence within the network.

7. The collaborative robotic device work group of claim 1 wherein robotic devices may be assigned identifying tags that associate them with subgroups of robotic devices, tags being based on any of: a model; a unique identifier; a country of origin; a manufacturer; a firmware version; a software version; an operating system; functionality; and any other parameters of a robotic device.

8. The collaborative robotic device work group of claim 1 wherein robotic devices further store specifications regarding robotic devices in said database, specifications including any of: location; model; type; functionality; role; software version; and any other characteristics of a robotic device.

9. The collaborative robotic device work group of claim 1 wherein robotic devices may be assigned rankings that control what kinds of signals may be exchanged to and from particular robotic devices.

10. The collaborative robotic device work group of claim 1 wherein robotic devices may be assigned master or slave roles that dictate how information will be shared between robotic devices.

11. The collaborative robotic device work group of claim 1 wherein robotic devices are further provided with lists of restrictions and lists of permissions that indicate what information may be and may not be shared with other robotic devices.

12. The collaborative robotic device work group of claim 1 wherein authentication is accomplished by exchanging hash codes based on a secret passcode set at manufacture or during an initial set-up phase.

\* \* \* \* \*